A. R. SCHOENKY.
CLICKING MACHINE.
APPLICATION FILED FEB. 26, 1912.
1,068,455.
Patented July 29, 1913.
2 SHEETS—SHEET 2.
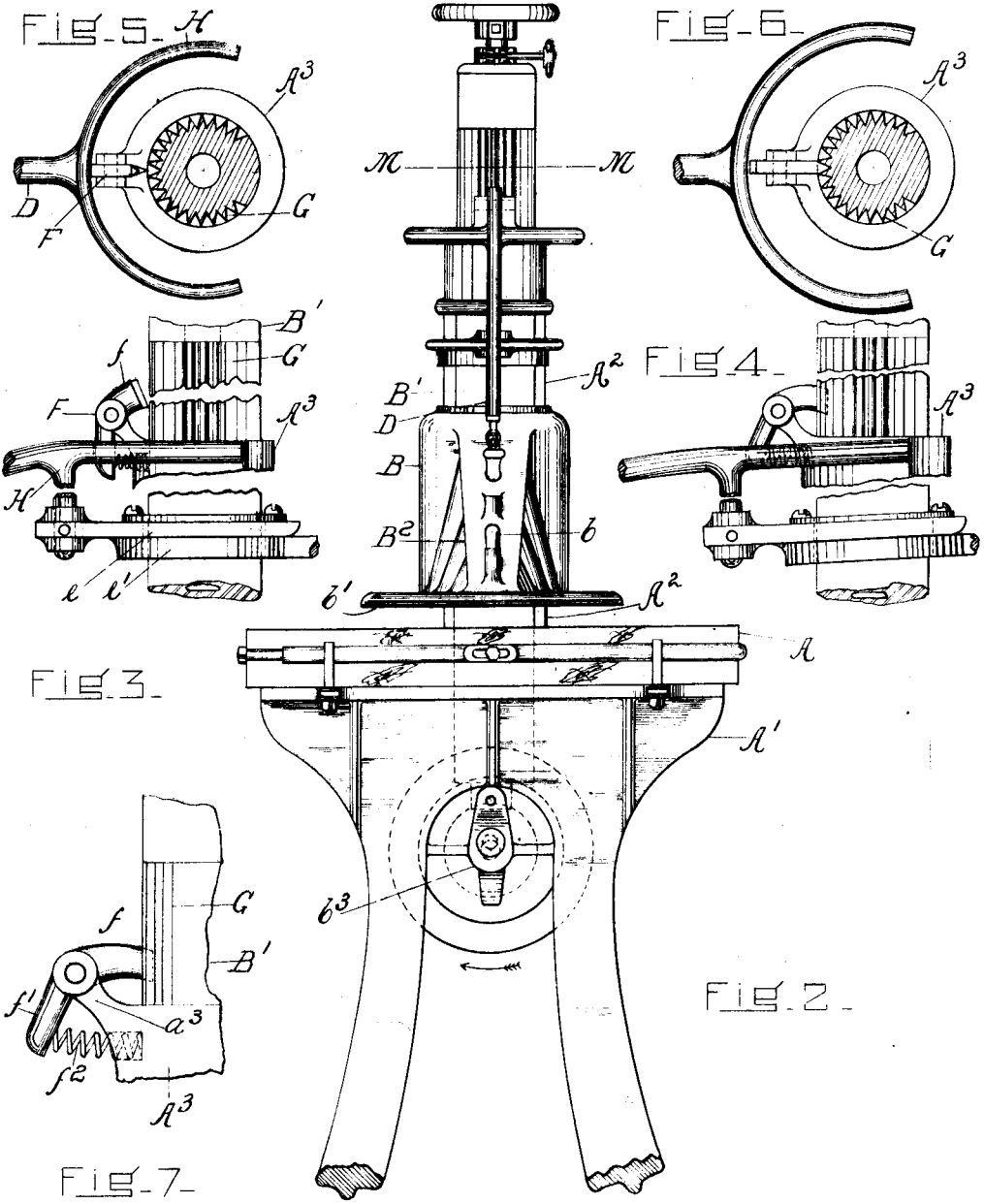
Witnesses:
E. B. King
M. R. Manning
Inventor—
August R. Schoenky,
By his Attorneys,
Rogers, Kennedy & Campbell

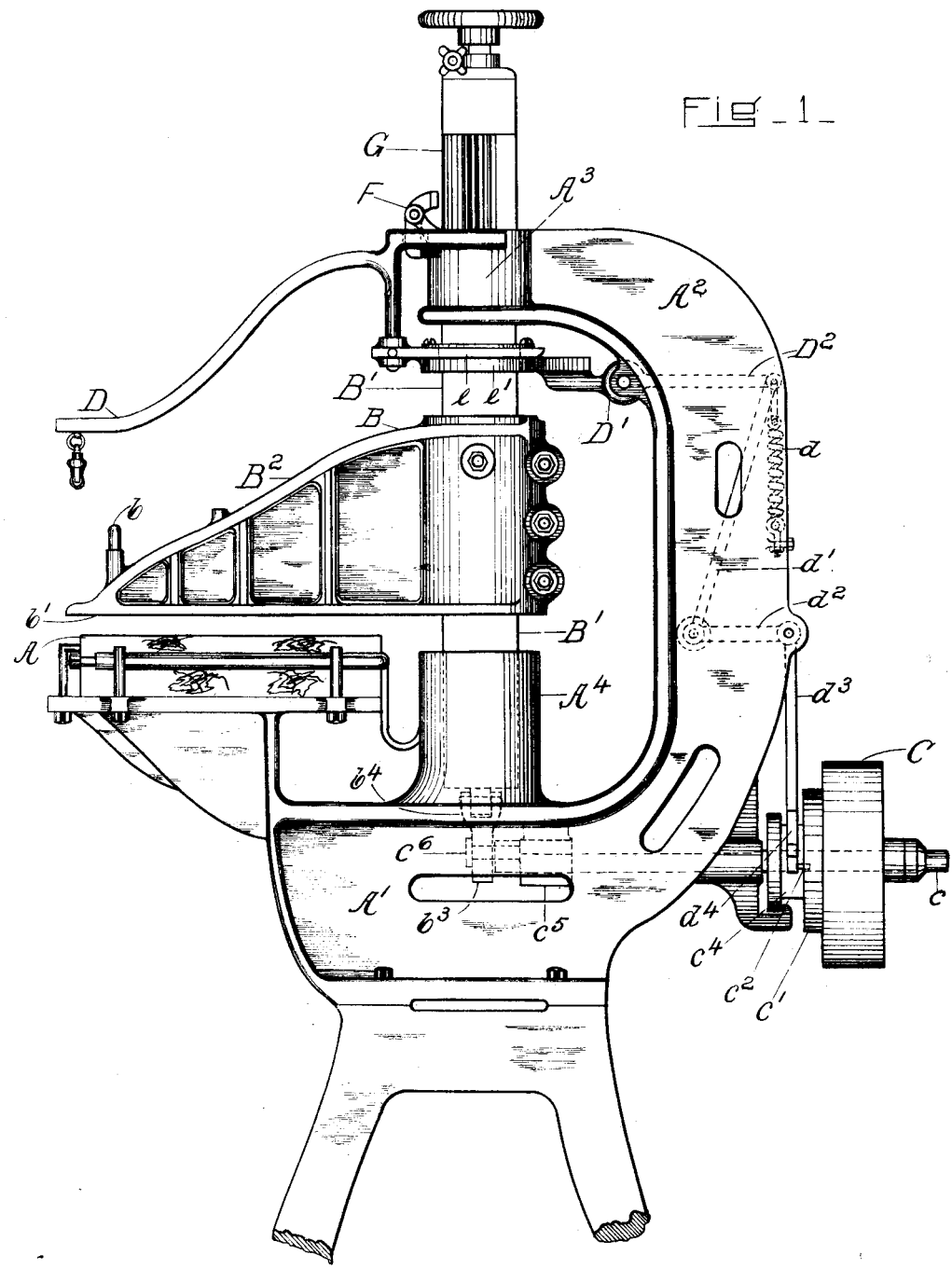

UNITED STATES PATENT OFFICE.

AUGUST R. SCHOENKY, OF SOMERVILLE, MASSACHUSETTS, ASSIGNOR TO THE REECE SHOE MACHINERY COMPANY, OF BOSTON, MASSACHUSETTS, A CORPORATION OF MAINE.

CLICKING-MACHINE.

1,068,455.  Specification of Letters Patent.  Patented July 29, 1913.

Application filed February 26, 1912. Serial No. 680,044.

*To all whom it may concern:*

Be it known that I, AUGUST R. SCHOENKY, a citizen of the United States, residing at Somerville, in the county of Middlesex and State of Massachusetts, have invented certain new and useful Improvements in Clicking-Machines, of which the following is a specification, reference being had therein to the accompanying drawing.

My invention relates to clicking machines, that is to say machines operating on the general principle hereinbelow described, for cutting out of leather or other stock the necessary shapes to form the upper or other parts of shoes or the like.

In a clicking machine such as herein described, there is a table, above which is a ram or hammer arm having means to cause it to descend toward the table at will. Any desired cutting dies will be properly positioned upon the stock by the operator, and the stock and die laid on the table, so that the ram may be caused to descend to force the die through the stock. In a machine of this type, the ram or hammer arm is a large heavy casting, and its actual movement will be comparatively small, so that when elevated it will not clear the table by a large space. To enable proper access to the table, the ram is made capable of swinging usually either to right or left, so that it normally may stand to one side while the stock and die are being adjusted, the operator then swinging the ram to a position over the die preparatory to causing the ram's descent for effecting the clicking or cutting.

In operating a machine of this type, there is a danger that the descent of the ram may be effected before the swinging movement thereof has been completed, which would produce a shearing movement that would be injurious to the accuracy of the work and injurious also to the dies and the machine.

It is one object of the present invention to overcome the danger of this shearing action.

Other objects will appear in the hereinafter following description, or will be apparent to those skilled in the art.

I will first describe one form of machine embodying my improvements, and will then set forth the novel features in the claims.

In the accompanying drawings, forming a part hereof, Figure 1 is a right-hand elevation of a clicking machine embodying my present invention. Fig. 2 is a front elevation thereof. Fig. 3 is a right-hand view of some of the upper parts of the machine, they being broken-away for the purpose of limiting the space required by the figure. Fig. 4 is similar to Fig. 3, showing the parts in a different position. Fig. 5 is a top view partly in section of the parts shown in Fig. 3. Fig. 6 is a top view partly in section of the parts as shown in Fig. 4. Fig. 7 shows an enlarged detail in right-hand view.

Similar letters of reference designate corresponding parts in the several figures of the drawings.

Generally speaking the herein described machine includes a table member, on which the work is laid, together with a hammer member having a movement of reciprocation normal to the top of the table for delivering successive blows, one of the two, the hammer member rather than the table, having movement parallel to the table top surface, for relatively bringing the two into suitable registry, a device shiftable to and from operative position and adapted when at operative position to prevent such relative parallel registering movement while permitting the normal blow-delivering movement, a power member or driving shaft, a controller or handle, connections from the controller for causing the power shaft to actuate the hammer to deliver blows, and other connections from the controller for shifting the aforesaid device from inoperative to operative position, whereby the blows are necessarily struck with a purely normal movement rather than a shearing movement.

The details of the table A need not be set forth. Said table is supported upon the frame and base parts A', and the latter at the rear have an upwardly extending head $A^2$, said head extending forwardly above to where it is provided with the enlargement $A^3$ bored or machined out to receive and guide in its up and down movements a vibrating ram B, or rather the cylindrical portion B' thereof, said portion B' having also a guide $A^4$ below.

The ram B comprises in addition to the cylindrical portion B', a forwardly extending portion B² which may for convenience be termed a hammer arm, since it is in the form of an arm and is the actual part that pounds or hammers the die upon the table A.

As before indicated the ram B is capable not only of up and down reciprocation, but also of a rotation in its bearings or guides so that the arm B² may be swung preferably either to right or left of its normal position shown in the figures. A handle $b$ is shown on the forward part of arm B² to facilitate its swinging. As will be seen the under surface $b'$ of the hammer arm is a flat surface parallel with the table A, that is to say both of them are horizontal, and of considerable area so that no accuracy is necessary in positioning the arm so long as any part of its surface entirely covers the dies to be operated.

For causing the upward and downward movements of the ram the following mechanism may be employed. It is desirable that the actuation only occur at the operator's will, as for example during the time that he is pressing a hand lever or the equivalent. As a source of power a pulley C may be employed, it being loose upon horizontal shaft $c$, and said pulley being driven by a belt or otherwise. In front of the pulley is a casting $c'$ having projecting forwardly from it a lug $c^2$ which is adapted to engage at times another lug for the purpose of causing the rotation of shaft $c$. The second lug (not seen) is yieldingly radially supported in the rotating cylinder $c^4$ secured upon shaft $c$, and so arranged that when projecting outwardly from said cylinder, the lug $c^3$ is in a position to be engaged by lug $c^2$ so that the shaft $c$ will rotate with pulley C.

The shaft $c$ extends forwardly to where near its forward end it is provided with a bearing $c^5$, and beyond the bearing a crank or pin $c^6$ which engages in a block $b^3$ connected by yoke $b^4$ to the lower end of the cylindrical portion B' of the ram B. The throw of the crank is comparatively short so that the rotation of shaft $c$ causes slight upward and downward movements of the ram.

For effecting the starting and stopping of the ram's movements, a hand lever D is employed, it being preferably centrally arranged over the table A, and therefore of convenient access, and it being so shaped as to extend around the ram to the point D' where the lever D is pivoted and from which as a center it takes its movements. A rearward extension D² of the lever D is connected to a spring $d$ which pulls downwardly, and thereby tends normally to maintain the handle D in upward position. A link $d'$ is pivotally connected to the rear end of extension D², and also to the forward portion $d^2$ of a bell crank lever, whose downwardly extending portion $d^3$ is yoked at the lower end $d^4$ so as to straddle the cylinder $c^4$ previously mentioned. In the position shown the yoke $d^4$ stands over the yielding lug before mentioned, so as to keep it within the recess in the cylinder $c^4$ and therefore out of engagement with the revolving lug $c^2$. If the operator pull down the handle D, its rear end D² will be thrown upwardly and the yoke $d^4$ will be thrown to the left, thus uncovering the yielding lug and permitting it to project to where the coöperating lug $c^2$ will strike it to cause the rotation of the shaft $c$.

The handle or lever D is seen to have a peculiar shape forward of its pivot D'. The ring portions $e$, $e'$ of the handle D surround the ram and are relatively movable so that the forward part of the handle D can be swung to right or left as the operator may find convenient without interfering with its operation.

In order to stop the swinging of the hammer arm B² in time to prevent objectionable shearing thereby, I have provided devices for locking the ram against rotation or swinging. Thus a part which may be termed a swing-stop F is fitted upon an extension $a^3$ of the enlargement A³ of the frame, this swing-stop being capable of shifting from open to closed position. Fig. 1 shows the swing-stop in open position, the ram not being locked and the hammer arm being free to be swung to right or left. The swing-stop is shown in enlarged view in Fig. 7 where it is in closed position. The swing-stop will be seen to consist of a toe $f$ on one side of a pivot and a heel $f'$ on the other side; the latter being pressed outwardly by a spring $f^2$ so as to throw the toe $f$ inwardly toward the ram B.

The ram at or adjacent to the toe $f$ is serrated, by which I mean provided with projections or teeth, or grooved, recessed or notched in any suitable way to coöperate with the toe $f$. Thus longitudinal serrations are shown at G, these extending over an ample portion of the ram's surface both vertically and circumferentially, so that wherever the swing-stop F may contact the ram it will meet with serrations and engage in the recesses therebetween. As seen in Figs. 5 and 6, the serrations may consist simply of pointed teeth extending longitudinally or vertically, while the toe $f$ is of pointed shape to snugly engage in the serrations. When the toe is engaged in the serrations the ram is locked against rotation or swinging, but since the serrations are longitudinal in direction, the ram is still capable of its up and down reciprocations.

The following is a preferred way of operating the swing-stop F. The spring $f^2$ already referred to provides the tendency to cause the engagement of the swing-stop with the serrations G. Normally the swing-stop should be disengaged therefrom so as to permit the free swinging of the arm $B^2$. To this end the handle D is formed as clearly indicated in Fig. 1, with an upward sweep and at its highest point it is provided with an arc-shaped extension or member H concentric with the axis of the ram and with the axis of the rings $e$, $e'$. This member H is adapted to coöperate with the heel $f'$ of the swing-stop to press it inward against the spring $f^2$, and thereby move the toe $f$ outward, and the parts are shown in this position in Figs. 1, 3. and 5. It is therefore seen that the condition of having the handle D in upward position causes the swing-stop to disengage from the ram.

Assume now that the operator is swinging the arm $B^2$ forwardly for performing a cutting operation, and is about to prematurely cause the descent of the ram by pulling the handle D downwardly. The instant the handle is pulled member H thereon retreats from the heel of the swing-stop and permits the latter to shift into position where its toe engages in the serrations of the ram, as seen in Figs. 4, 6 and 7. This immediately causes a stoppage of the swinging movement and locks the ram against swinging or rotation. Thereupon the ram and arm may safely be caused to descend upon the dies. In this way the object before stated of avoiding shearing and the dangers thereof, is accomplished. Since the present improvement may be modified in various ways, and embodied in different forms of machines, I do not wish to be limited to the precise details hereinabove described, except so far as the same are set forth in the appended claims.

What I claim and desire to secure by Letters Patent is:

1. A clicking machine including in combination, a table, an ascending and descending ram, a laterally swinging hammer carried by the ram and adapted to strike blows on its descent, a shiftable stop device mounted on a relatively stationary part of the machine, a series of vertical serrations carried by said ram and partaking of all its movements, and a single controller having connections both for shifting said stop device into engagement with said serrations to stop said hammer's swinging and for causing the descent of said ram and hammer relatively to said table and said stop device.

2. A clicking machine comprising in combination, a reciprocating and swinging ram having longitudinal serrations on a cylindrical portion thereof, a pivoted swing-stop having a toe adapted to engage said serrations, a spring tending to cause such engagement, a member as H for normally holding said swing-stop out of engagement, and a handle both for withdrawing said member to permit the swing-stop to lock the ram, and for causing the ram to be reciprocated.

3. A clicking machine, including in combination, a table member, a hammer member having a movement normal to the table member for delivering successive blows, one of said members having a movement parallel to the table surface for bringing said members into suitable registry, a device shiftable to and from operative position adapted to prevent the aforesaid parallel movement, while permitting the aforesaid normal movement, a power member, a controller or handle, connections from said controller for causing the power member to actuate the hammer member, and other connections from said controller for shifting said device to operative position, whereby the blow is struck with a purely normal movement.

4. A clicking machine including in combination, a table member, a hammer member having a movement normal to the table member for delivering successive blows, one of said members having a movement parallel to the table surface for bringing said members into suitable registry, a device shiftable to and from operative position adapted to prevent the aforesaid parallel movement while permitting the aforesaid normal movement, a power member, a controller or handle; connections from said controller for causing the power member to actuate the hammer member, and other connections from said controller for shifting said device to operative position, whereby the blow is struck with a purely normal movement, said device being relatively stationary with respect to the hammer member's movements, and carried elsewhere than on said hammer member.

5. A clicking machine including in combination, a table member, a hammer member having a movement normal to the table member for delivering successive blows, one of said members having a movement parallel to the table surface for bringing said members into suitable registry, a device shiftable to and from operative position adapted to prevent the aforesaid parallel movement while permitting the aforesaid normal movement, a power member, a controller or handle, connections from said controller for causing the power member to actuate the hammer member, and other connections from said controller for shifting said device to operative position, whereby the blow is struck with a purely normal movement, said device being relatively stationary with respect to the hammer member's movements, and carried elsewhere than on said hammer
5 member, and coöperating with the longitudinal serrations on the member which has the aforesaid parallel movement.

In testimony whereof I affix my signature in presence of two witnesses.

AUGUST R. SCHOENKY.

Witnesses:
 THOMAS J. CARTY,
 HAROLD J. WOOD.